(12) United States Patent
Foster, III

(10) Patent No.: US 8,196,382 B2
(45) Date of Patent: Jun. 12, 2012

(54) POLYMER DECK FOR PULL TYPE ROTARY MOWING DEVICES

(76) Inventor: Weaver F. Foster, III, Baytown, TX (US)

( * ) Notice: Subject to any disclaimer, the term of this patent is extended or adjusted under 35 U.S.C. 154(b) by 52 days.

(21) Appl. No.: 12/389,835

(22) Filed: Feb. 20, 2009

(65) Prior Publication Data

US 2009/0205306 A1      Aug. 20, 2009

Related U.S. Application Data

(60) Provisional application No. 61/029,942, filed on Feb. 20, 2008.

(51) Int. Cl.
*A01D 67/00*      (2006.01)
(52) U.S. Cl. ......................................... 56/320.1; 56/17.5
(58) Field of Classification Search ................... 56/12.7, 56/17.1, 320.1, 17.5
See application file for complete search history.

(56) References Cited

U.S. PATENT DOCUMENTS

| | | | | |
|---|---|---|---|---|
| 3,699,752 A | * | 10/1972 | Dandl | ............................. 56/13.6 |
| 4,887,420 A | | 12/1989 | Cerny, Jr. et al. | |
| 4,899,526 A | | 2/1990 | Harris | |
| 4,916,889 A | * | 4/1990 | Molstad | ........................ 56/14.9 |
| 5,005,344 A | * | 4/1991 | McCracken | .................. 56/14.7 |
| 5,157,908 A | | 10/1992 | Sebben et al. | |
| 5,638,668 A | | 6/1997 | Kallevig et al. | |
| 5,884,466 A | | 3/1999 | Willmering et al. | |
| 6,363,616 B1 | * | 4/2002 | Kreissle | .......................... 30/347 |
| 7,784,255 B2 | * | 8/2010 | Moore et al. | ................. 56/320.1 |

* cited by examiner

*Primary Examiner* — Alicia Torres
(74) *Attorney, Agent, or Firm* — James Ray & Assoc.

(57) ABSTRACT

A mower deck for a rotary vegetation cutting mower device pulled by a motor vehicle includes a housing defining a main portion disposed generally horizontally when the mower deck is in a position for cutting the vegetation and a pair of side walls extending downwardly from the main portion generally perpendicular thereto and forming in combination with the main portion a compartment of the housing wherein the blade rotates. At least one of at least one reinforcing rib and raised portion is disposed on the top surface of the main portion. A plate is releaseably secured to the top surface of the housing and carries a gearbox thereon. The housing and the plate are manufactured from a polypropylene material having a thickness of about one inch.

6 Claims, 3 Drawing Sheets

POLYMER DECK FOR PULL TYPE ROTARY MOWING DEVICES

CROSS-REFERENCE TO RELATED APPLICATIONS

This application is related to and claims priority from Provisional Patent Application Ser. No. 61/029,942 filed on Feb. 20, 2008.

FIELD OF THE INVENTION

The present invention relates, in general, to rotary mowing devices and, more particularly, this invention relates to a polymer mower deck for a pull type rotary mowing device.

BACKGROUND OF THE INVENTION

As is generally well known, conventional vegetation mowing devices that are pulled behind a farm tractor or the like farm equipment, and that are powered by the Power Takeoff (PTO) shaft of such tractor employ mower decks that are made from metal and, more particularly, from steel that are painted in order to prevent steel oxidation that may eventually cause such metal mower deck to rust. However, as is well known, the paint is not effective in preventing rust due to the abuse seen by the mower deck during operation and storage. Thus, the user of such mowing devices is burdened by higher then desirable repair costs.

It is also common for such mower decks to encounter rigid objects, such as timbers, iron bars and the like that are disposed within the vegetation to be mowed and that are contacted by the rotating blade of the mowing device during operation. It is also common for such rigid objects to get wedged between the top surface of the blade and bottom surface of the mower deck and exert a greater than allowable force onto the gearbox. This high force causes the portion of the metal deck around the gearbox mounting holes to tear thus affecting the structural rigidity of the mower deck and rendering it inoperable without repair. The repair effort involves cutting gout a damaged portion and welding a plate that has the mounting hole pattern. When the structural damages are severe, the user is forced to purchase an entire mowing device as many manufacturers do not offer replacement mower decks. Thus, the user is further burdened by higher then desirable replacement costs.

Prior to the conception and development of the present invention, efforts have been made to alleviate disadvantages associated with use of metal mower decks. For example, U.S. Pat. No. 5,157,908 issued to Sebben et al. and U.S. Pat. No. 4,887,420 issued to Cerny, Jr. et al. disclose a mower deck for a riding lawn mover that is made entirely from thermoplastic material. In another example, U.S. Pat. No. 5,638,668 issued to Kallevig et al. teaches a plastic liner for a metal deck.

However, applicant is not aware of plastic decks that are designed to withstand operational rigors of mowing devices pulled behind a farm tractor and that reduce maintenance and replacement costs of such devices due to encounters with rigid objects. Thus, there is a need for the polymer mower decks for mowing devices pulled behind the farm tractor that reduce maintenance and repair costs associated with operational environment.

SUMMARY OF THE INVENTION

In accordance with one aspect, the invention provides a mower deck for a mower device pulled by a farm vehicle. The mower device has a rotating blade for cutting vegetation. The blade is driven by a gearbox coupled to a power takeoff shaft of the motor vehicle. The mower deck assembly includes a main portion disposed generally horizontally when said mower deck is in a position for cutting said vegetation. The main portion has each of a substantially planar top surface and substantially planar bottom surface. There is a pair of side walls. Each of the pair of side walls extends downwardly from the main portion generally perpendicular thereto and forms in combination with the main portion a compartment of the housing wherein the blade rotates. A pair of flanges is disposed horizontally when the mower deck is in the position for cutting the vegetation. Each of the pair of flanges extends outwardly from a bottom edge of a respective side wall. A drive shaft aperture is formed through a thickness of the main portion. A predetermined plurality of first apertures formed through the thickness of the main portion in radial alignment relative to the drive shaft aperture. A predetermined plurality of second apertures are formed in a predetermined pattern through the thickness of the main portion; at least a pair of spaced apart flanges extending upwardly from the top surface of the main portion In another aspect, the housing of the mower deck assembly is configured to receive two rotating blades therewithin and accepts a pair of plates, each provided for a respective gearbox.

In yet another aspect, the mower deck assembly is configured as a trio of housing sections, each carrying a rotating blade. The two side housing sections are hinged to a center housing section.

OBJECTS OF THE INVENTION

It is, therefore, one of the primary objects of the present invention to provide a mower deck for pull type rotary mowing devices.

Another object of the present invention is to provide a mower deck that is manufactured from polypropylene material.

Yet another object of the present invention is to provide a mower deck that generally has a thickness of about one inch.

A further object of the present invention is to provide a mower deck that includes an intermediate plate attached to the top surface of the mower deck and carrying a gearbox thereon.

Yet a further object of the present invention is to provide mower deck that has a pair of flanges for attachment to the pulling linkage of the motor vehicle.

An additional object of the present invention is to provide mower deck assembly carrying a plurality of individually housed and commonly driven rotating blades.

Another object of the present invention is to provide a mower deck that can be simply and easily retrofitted on pull type rotary mowing devices presently in use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figures 1, 3:
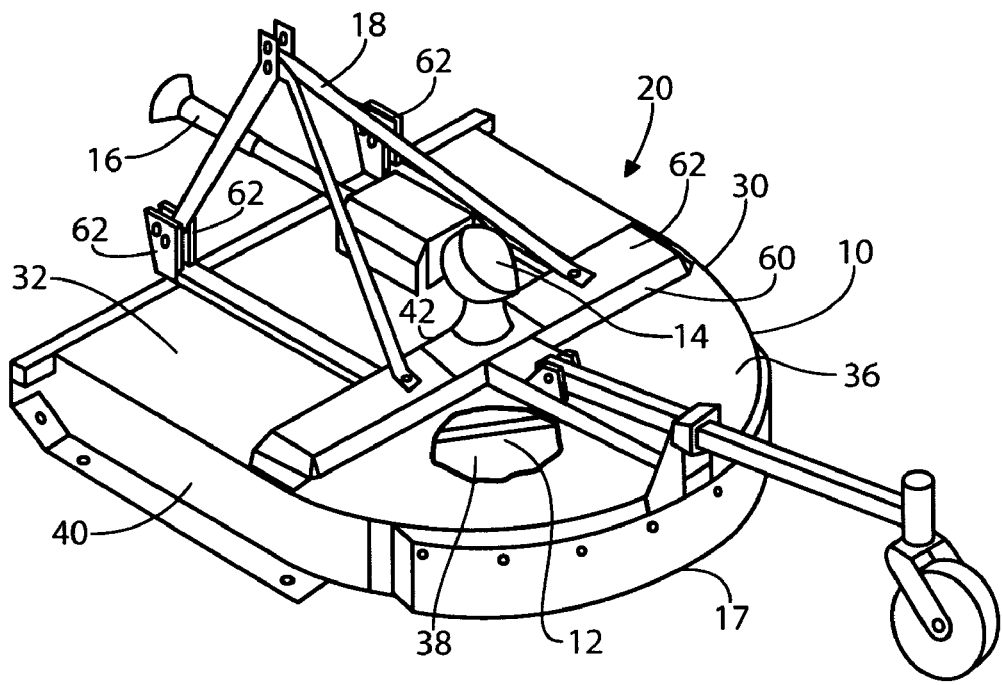
FIG. 1 illustrates an isometric view of a mower deck constructed in accordance with one embodiment of the invention.
FIG. 3 illustrates a partially exploded isometric view of a mower deck constructed in accordance with another embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its present embodiments, herein depicted within FIGS. 1 through 4. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

The present invention provides a mower deck assembly that is manufactured from polypropylene material having a general thickness of about one inch and that includes a gearbox carrying plate of like thickness and material that is releaseably secured to the top surface of the mower deck providing a designed failure connection should the rotating blade attached to the gearbox encounter a rigid object such as a timber, iron bar and the like.

Figure 5:
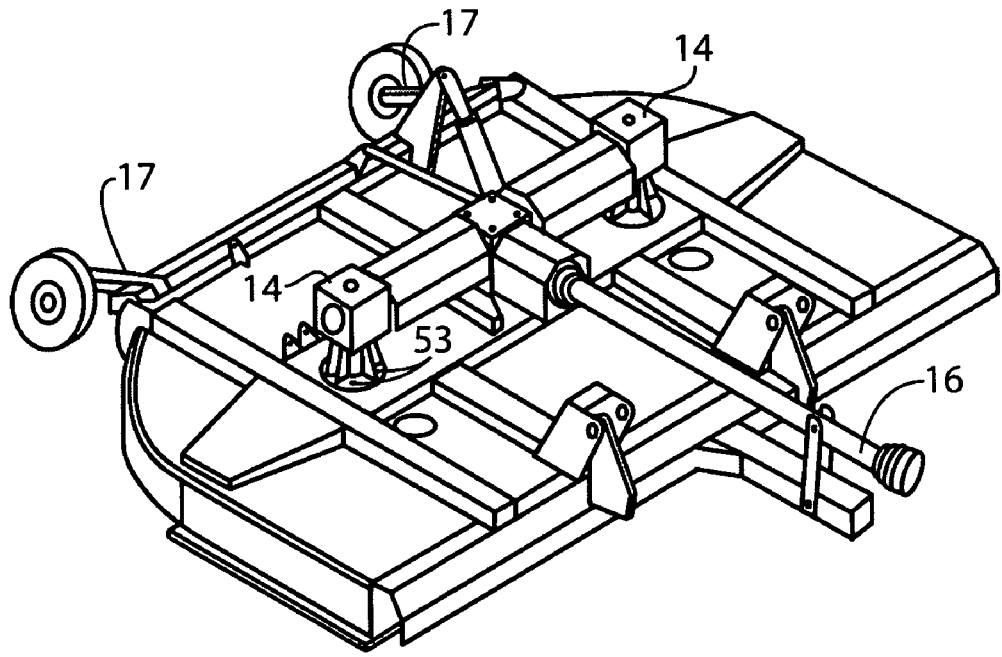
FIG. 5 is an exploded isometric view of a prior art mower deck.

The present invention is illustrated and described in combination with mowers (herein described as the "device") manufactured under a Rhino® brand by an Alamo Group Company of Gibson City, Ill. A double-blade configuration of such mower is shown in FIG. 5, labeled as "Prior Art". However, it will be apparent to those skilled in the relevant art that the present invention may be applied to other mower devices and as such should not be interpreted as a limiting factor of the mower deck assembly 20 of the present invention.

Figure 2:
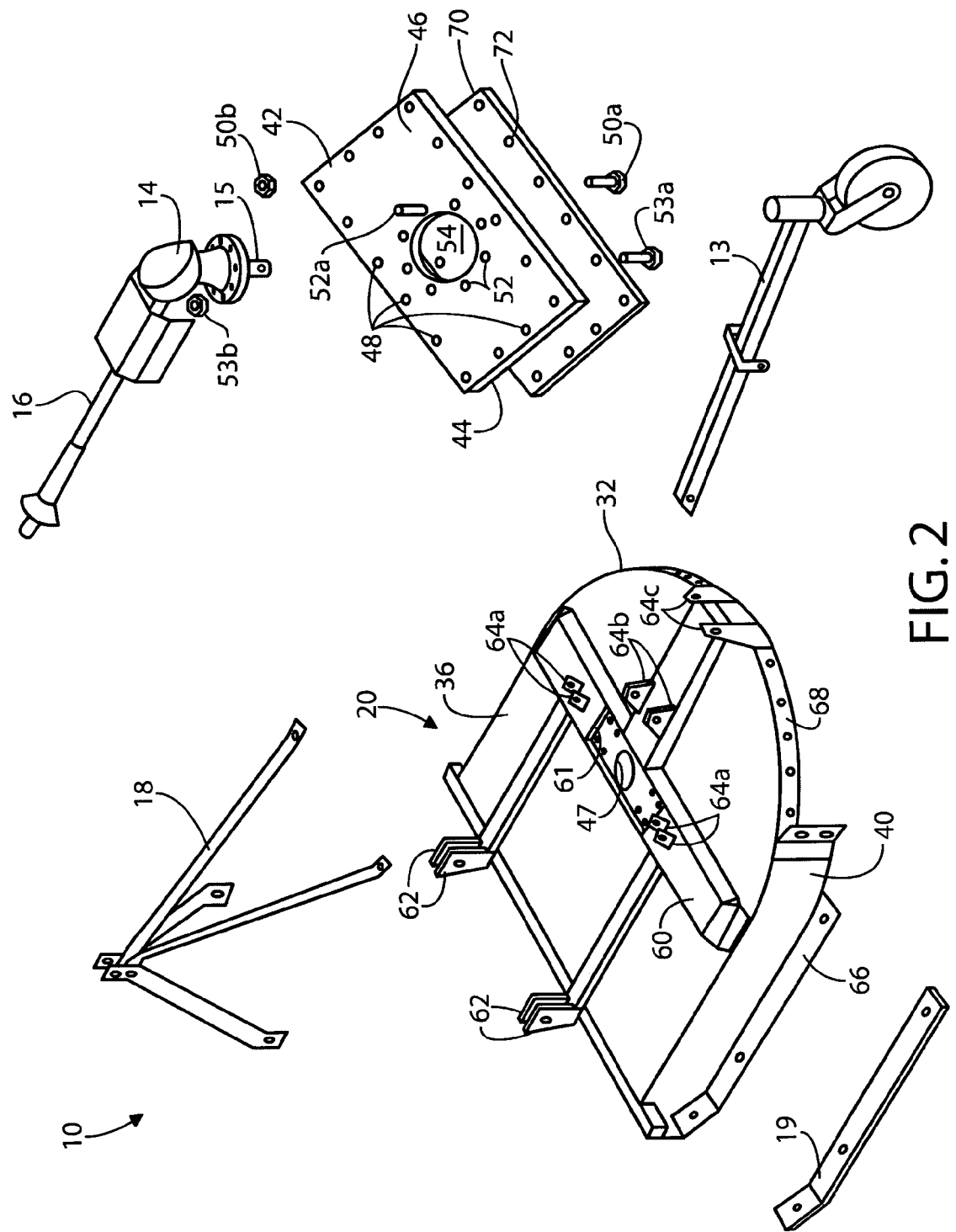
FIG. 2 illustrates an exploded isometric view of the mower deck of FIG. 1.

Now in reference to FIGS. 1-2, there is illustrated a mower deck assembly, generally designated as 20, for a mower device 10 having a single rotating blade 12 for cutting vegetation, wherein the blade 12 is driven by a gearbox 14 that has a connection 16 for coupling to a power takeoff shaft (PTO) of the motor vehicle (not shown).

The mower deck assembly 20 includes a housing 30 defining a main portion 32 disposed generally horizontally when the mower deck assembly 20 is in a position for cutting the vegetation. There is also a pair of side walls 40 extending downwardly from the main portion 32 generally perpendicular thereto, wherein only one side wall 40 shown in FIGS. 1-2. The pair of peripheral side walls 40 forms in combination with the main portion 32 a compartment 38 of the housing 30 wherein the blade 12 rotates. Preferably, the peripheral side wall 40 is formed integral with the main portion 32.

There is a plate 42 that is releaseably affixed to the main portion 32. The plate 42, best shown in FIG. 2, has a substantially planar bottom surface 44 thereof abuttingly engaging the top surface 36 of the main portion 32. A predetermined plurality of apertures 48 are formed through the plate 42 so that such plate 42 can be secured with threaded bolts 50a and nuts 50b. Accordingly, a predetermined plurality of apertures 49a are formed through the thickness of the main portion 32 in alignment with the predetermined plurality of apertures 48 and in radial alignment relative to a drive shaft aperture 47 formed through the thickness of the main portion 32. The plate 42 is provided to carry the gearbox 14 affixed to a substantially planar exposed surface 46 thereof by way of the threaded bolts 53a and nuts 53b and accordingly, provides a predetermined plurality of apertures 52. The number, pattern and size of apertures 52 are selected based on the specific type and/or manufacturer of the gearbox 14. Alternatively, the bolts 53a and aperture 52 may be replaced with threaded studs 52a.

An aperture 54 is also formed, generally centrally, through the thickness of the plate 42 to accommodate drive shaft 15 of the gearbox 14 that also extends through the aperture 47. Although the plate 42 is shown in FIGS. 1-2 as having a rectangular shape, other shapes are also within the scope of the present invention.

At least a pair of spaced apart flanges 62 extend upwardly from the top surface 36 of the main portion 32 for coupling the mower deck assembly 20 to the motor vehicle (not shown) in a conventional manner. Additionally, upstanding flanges 64a are provided for attachment of an A-frame 18 and the upstanding flanges 64b, 64c are provided for attachment of the tail wheel assembly 13.

The housing 30 also includes a pair of flanges 66, only one of which is shown in FIGS. 1-2, each extending outwardly and generally perpendicular to a respective side wall 40 for attachment of the conventional skid plates 19.

Additionally, a flange 68 is provided at the distal end of the housing 30 for receiving a conventional elastic flap or chain mesh 17, shown in FIG. 1.

In the presently preferred embodiment of the invention, to achieve strength level of the housing 30 sufficient to withstand operational rigors without failure, such housing 30 is manufactured from engineered thermoplastic such as polypropylene and, more particularly such as Tipcolene® brand manufactured by Tipco Industries Ltd of Mumbai, India in order to provide the required strength of the housing 30. Furthermore, it has been found essential to adapt such housing 32 with a thickness of about one inch.

Likewise, the plate 42 is manufactured from polypropylene material having a thickness of about one inch.

The thickness of each of the main portion 32 and the plate 42 is advantageous for maintaining the distance between the bottom surface of the main portion 32 and the top surface 46 of the plate 42 so as to position the blade 12 at the same distance from the bottom surface of the main portion 32 as it is present on conventional mower devices 10 using a metal mower deck and allow for use of conventional gearboxes 14 that all have commonly sized drive shaft 15. Thus, the mower deck assembly 20 can be easily retrofitted on the mowing devices 10 presently in used without substantially affecting assembly and coupling of the mower device 10 while reducing its maintenance and repair costs.

The housing 30 may also include at least one optional reinforcing rib or raised portion 60 disposed on the top surface 36 of the main portion 32 and integrally formed therewith. When such reinforcing rib or raised portion 60 is provided, the housing 30 also includes a recess 61 sized to receive the plate 42 and maintain the above described distance.

The present invention also contemplates use of a metal spacer plate 70 sized substantially equal to the size of the plate 42 but having a reduced thickness of about 0.25 inches in order to accommodate mower decks 20 that may have been partially damaged during use or accommodate applications having known presence of a large number of detrimental rigid objects (not shown).

Now in further reference to FIG. 3, therein is illustrated another embodiment, wherein the mower deck assembly 100 is configured to carry two rotating blades (not shown), each driven by a gearbox 14. The structure of such mower deck assembly 100 is substantially identical to the structure of the mower deck 10 of FIG. 1, except for a pair of plates 42 to accommodate the pair of gearboxes 14 and thus its detail description is omitted in this document for the sake of brevity.

Figure 4:
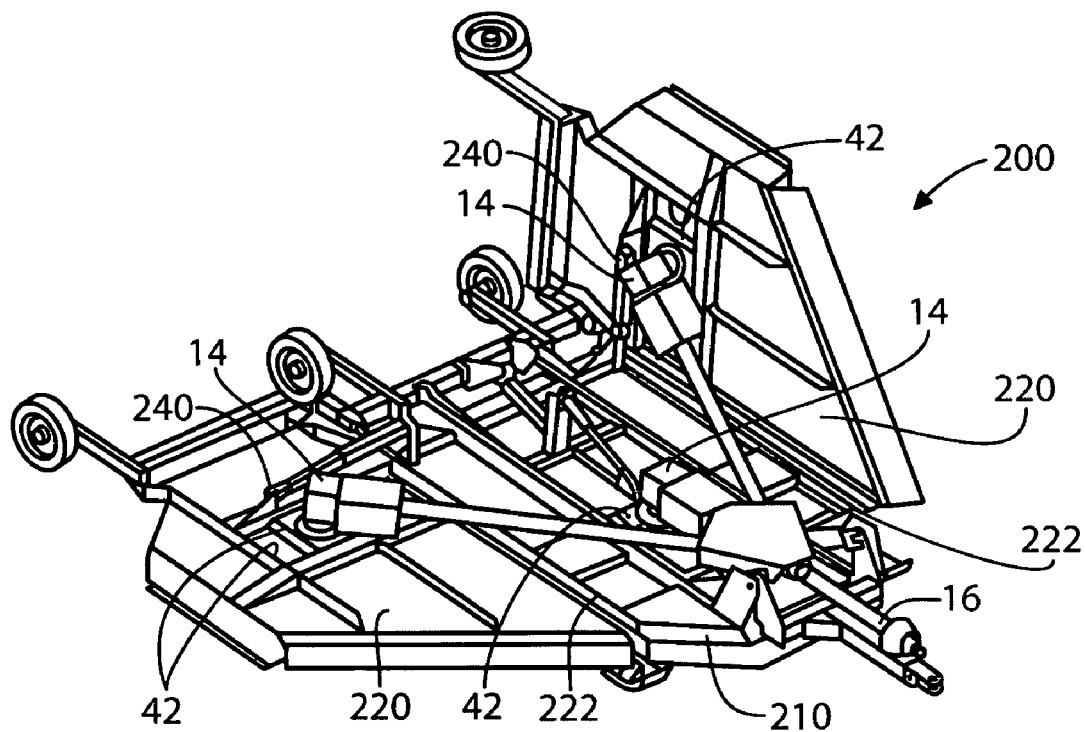
FIG. 4 illustrates an isometric view of a mower deck constructed in accordance with yet another embodiment of the invention.

It is also within the scope of the present invention to provide a mower deck assembly 200 for a mower device of a wing type, as best shown in FIG. 4. Such mower deck assembly 200 essentially comprises a center mower deck 210 and a pair of side mower deck 220, each hinged with a hinge 222 at one edge thereof to a respective side of the center mower deck 210. Each of the center and side decks, 210, 220 respectively carry a gearbox 14 mounted on the plate 42. Each mower deck is constructed generally identical to the above described mower deck 10 and thus, the detail description is omitted in this document for the sake of brevity. However, it will be understood that deck assembly 200 includes additional provisions for mounting powered devices 240 for lifting and lowering side mower decks 220.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. In combination with a mower device pulled by a farm vehicle, said mower device having a rotating blade for cutting vegetation, said blade driven by a gearbox coupled to a power takeoff shaft of said farm vehicle, a mower deck assembly manufactured from a polymer material having a thickness of about one inch, said mower deck assembly comprising:
   (a) a main portion disposed generally horizontally when said mower deck is in a position for cutting said vegetation, said main portion having each of a substantially planar top surface and substantially planar bottom surface;
   (b) a pair of side walls, each of said pair of side walls extending downwardly from said main portion generally perpendicular thereto and forming in combination with said main portion a compartment of a housing wherein said blade rotates;
   (c) a pair of flanges disposed horizontally when said mower deck is in said position for cutting said vegetation, each of said pair of flanges extending outwardly from a bottom edge of a respective side wall;
   (d) a drive shaft aperture formed through a thickness of said main portion;
   (e) a predetermined plurality of first apertures formed through said thickness of said main portion in radial alignment relative to said drive shaft aperture; and
   (f) a predetermined plurality of second apertures formed in a predetermined pattern through said thickness of said main portion; at least a pair of spaced apart flanges extending upwardly from said top surface of said main portion,
   wherein said mower deck assembly includes a plate manufactured from a polymer material, said plate having:
   (g) a predetermined shape;
   (h) a substantially planar upper surface thereof abuttingly engaging said gearbox, whereby said plate is positioned between said main portion and said gearbox;
   (i) a center aperture formed through a thickness of said plate;
   (j) a predetermined plurality of third apertures formed through a thickness of said plate in substantial alignment with said predetermined plurality of first apertures formed through said main portion;
   (k) a predetermined plurality of fourth apertures formed in a predetermined pattern through said thickness of said plate in substantial alignment with said predetermined plurality of second apertures formed through said main portion;
   (l) whereby said plate is attached in a releasable connection to said main portion with fasteners passed through said aligned fourth and second apertures; and
   (m) whereby said releasable connection is configured to fail when said rotating blade attached to said gearbox encounters a rigid object during operation of said mower device.

2. The mower deck assembly, according to claim 1, wherein said housing includes at least one of a reinforcing rib and raised portion disposed on said top surface of said main portion, a recess formed within said at least one of a reinforcing rib and raised portion, said recess sized to receive said plate therewithin so that said top surface of said plate is substantially coplanar with a top surface of said at least one of a reinforcing rib and raised portion.

3. The mower deck assembly, according to claim 2, wherein said at least one of reinforcing rib and said raised portion is formed integral with said main portion as a one-piece member.

4. The mower deck assembly, according to claim 1, wherein said mower deck assembly includes a metal spacer plate sized substantially identical to said plate but having a thickness thereof being less than a thickness of said plate.

5. In combination with a mower device pulled by a farm vehicle, said mower device having a pair of rotating blades for cutting vegetation, each of said pair of blades driven by a gearbox coupled to a power takeoff shaft of said farm vehicle, a mower deck comprising:
   (a) a housing manufactured from a polymer material having a thickness of about one inch, said housing including:
      (i) a main portion disposed generally horizontally when said mower deck is in a position for cutting said vegetation, said main portion having each of a substantially planar top surface and substantially planar bottom surface,
      (ii) a pair of side walls, each of said pair of side walls extending downwardly from said main portion generally perpendicular thereto and forming in combination with said main portion a compartment of said housing wherein said blade rotates,
      (iii) a pair of flange disposed horizontally when said mower deck is in said position for cutting said vegetation, each of said pair of flanges extending outwardly from a bottom edge of a respective side wall, (iv) at least one drive shaft aperture formed through a thickness of said main portion, (v) at least one predetermined plurality of first apertures formed through said thickness of said main portion in radial alignment relative to said at least one drive shaft aperture, (vi) at least one predetermined plurality of second apertures formed in a predetermined pattern through said thickness of said main portion, and (vii) at least a pair of spaced apart flanges extending upwardly from said top surface of said main portion;

(b) at least one plate manufactured from a polymer material, said plate including:

(i) a predetermined shape, (ii) a substantially planar bottom surface thereof abuttingly engaging said top surface of said main portion, a substantially planar upper surface thereof abuttingly engaging said gearbox, whereby said plate is disposed between said main portion and said gearbox, (iii) a center aperture formed through a thickness of said plate, (iv) a predetermined plurality of third apertures formed through a thickness of said plate in substantial alignment with said at least one predetermined plurality of first apertures formed through said main portion, and (v) a predetermined plurality of forth apertures formed in a predetermined pattern through said thickness of said plate in substantial alignment with said at least one predetermined plurality of second apertures formed through said main portion pair of plates;

(c) whereby said plate is attached in a releasable connection to said main portion with fasteners passed through said aligned fourth and second apertures; and (d) whereby said releasable connection is configured to fail when at least one of said pair of rotating blades attached to said gearbox encounters a rigid object during operation of said mower device.

6. In combination with a mower device pulled by a farm vehicle, said mower device having a predetermined plurality of rotating blades for cutting vegetation, each of said predetermined plurality of blades driven by a gearbox coupled to a power takeoff shaft of said farm vehicle, a mower deck assembly comprising:

(a) a center housing manufactured from a polymer material having a thickness of about one inch and defining a center main portion disposed generally horizontally when said mower deck is in a position for cutting said vegetation;

(b) at least one side housing manufactured from said polymer material having said thickness of about one inch and defining a side main portion disposed generally horizontally when said mower deck is in said position for cutting said vegetation and at least one side wall extending outwardly from said side main portion generally perpendicular thereto;

(c) a hinge means for pivotally attaching said at least one side housing to said center housing;

(d) each of said main portion and said side main portion having each of a substantially planar top surface and substantially planar bottom surface, a drive shaft aperture formed through said thickness of said each of said main portion and said side main portion, at least one predetermined plurality of first apertures formed through said thickness in radial alignment relative to said drive shaft aperture, and at least one predetermined plurality of second apertures formed in a predetermined pattern through said thickness of said each of said main portion and said side main portion; and (e) a predetermined plurality of plates manufactured from a polymer material, each of said predetermined plurality of plates having:

(i) a predetermined shape, (ii) a substantially planar bottom surface thereof abuttingly engaging a top surface of a respective main portion or a respective side main portion, a substantially planar upper surface thereof abuttingly engaging a respective gearbox, whereby said plate is disposed between said respective main portion or said side main portion and said respective gearbox, (iii) a center aperture formed through a thickness of said plate, (iv) a predetermined plurality of third apertures formed through said thickness of said plate in a substantial alignment with said at least one predetermined plurality of first apertures, (v) a predetermined plurality of second apertures formed in a predetermined pattern through said thickness of said plate in a substantial alignment with said least one predetermined plurality of second apertures, (vi) whereby said plate is attached in a releasable connection to said respective main portion or side main portion with fasteners passed through said aligned fourth and second apertures, and (vii) whereby said releasable connection is configured to fail when a respective one of said plurality of rotating blades encounters a rigid object during operation of said mower device.

* * * * *